(12) United States Patent
Oelpke (10) Patent No.: US 9,273,646 B2
(45) Date of Patent: Mar. 1, 2016

(54) CYCLONE SEPARATION DEVICE

(71) Applicant: MANN+HUMMEL GMBH, Ludwigsburg (DE)

(72) Inventor: Reinhard Oelpke, Harthausen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 100 days.

(21) Appl. No.: 14/027,575

(22) Filed: Sep. 16, 2013

(65) Prior Publication Data

US 2014/0165513 A1 Jun. 19, 2014

Related U.S. Application Data

(63) Continuation of application No. 13/987,317, filed on Sep. 14, 2012, now abandoned.

(51) Int. Cl.

| | |
|---|---|
| *B01D 50/00* | (2006.01) |
| *F02M 35/02* | (2006.01) |
| *B01D 45/16* | (2006.01) |
| *B01D 46/52* | (2006.01) |
| *B01D 45/12* | (2006.01) |
| *F02M 35/024* | (2006.01) |
| *F02M 35/022* | (2006.01) |
| *B04C 3/06* | (2006.01) |

(52) U.S. Cl.
CPC ............ *F02M 35/0216* (2013.01); *B01D 45/12* (2013.01); *B01D 45/16* (2013.01); *B01D 46/521* (2013.01); *B01D 50/002* (2013.01); *F02M 35/024* (2013.01); *F02M 35/0215* (2013.01); *F02M 35/0223* (2013.01); *B04C 3/06* (2013.01)

(58) Field of Classification Search
CPC .... B01D 50/002; B01D 45/16; B01D 46/521; B01D 45/12; B04C 3/06; F02M 35/0216; F02M 35/0215; F02M 35/0223; F02M 35/024
USPC ........ 55/385.1, 456, 457, 337, 345, 346, 428, 55/453–455, 349, 459.1
See application file for complete search history.

(56) References Cited

U.S. PATENT DOCUMENTS

| | | | | |
|---|---|---|---|---|
| 3,180,245 | A | * | 4/1965 | Erickson, Jr. et al. ......... 454/269 |
| 4,702,846 | A | * | 10/1987 | Ryynanen ..................... 210/788 |
| 8,012,227 | B2 | * | 9/2011 | Greif ............................... 55/337 |
| 2003/0217534 | A1 | * | 11/2003 | Krisko et al. .................... 55/337 |
| 2008/0209869 | A1 | * | 9/2008 | Rother et al. .................... 55/337 |
| 2010/0064643 | A1 | * | 3/2010 | Greif ............................... 55/321 |

* cited by examiner

*Primary Examiner* — Dung H Bui
(74) *Attorney, Agent, or Firm* — James Hasselbeck (57) ABSTRACT

A separating device (3) for separating particles from an intake air (2) of an internal combustion engine, comprising two cyclone cells (5, 6) which are designed to cause two raw air streams (7, 8) containing the intake air (2) to rotate oppositely and a discharge device (49) which is designed to guide an exhaust air stream (35, 36) containing the particles tangentially away from a respective cyclone cell (5, 6) and to combine the exhaust air streams (35, 36) to a common exhaust air stream (53).

8 Claims, 7 Drawing Sheets

Fig. 2

Fig. 3
( III - III )

CYCLONE SEPARATION DEVICE

CROSS REFERENCE TO RELATED APPLICATIONS

This application is a Non-Provisional of Provisional Application No. 61/701,065 filed Sep. 14, 2012, the entire disclosure of which is incorporated herein by reference.

TECHNICAL FIELD

The present invention concerns a separating device for separating particles from an intake air of an internal combustion engine. Moreover, the present invention concerns an arrangement for purifying an intake air of an internal combustion engine.

BACKGROUND

Cyclone cells, which are also referred to as cyclone, cyclone filter, cyclone separator or centrifugal separator, serve to separate solid or liquid particles contained in fluids. A fluid flowing into a cyclone cell is guided in such a way that centrifugal forces accelerate the particles that are to be separated from the fluid in outward direction and feed them to a discharge device. For generating the centrifugal forces, usually guide apparatus are used which comprise guide vanes that generate a swirl flow within a housing of the cyclone cell.

Such cyclone cells are used in particular as pre-separators in air filtration for intake air of internal combustion engines for road vehicles, construction machines or agricultural vehicles.

SUMMARY OF THE INVENTION

An object of the present invention resides in that a separating device is to be provided which is of a small size and has a high degree of separation.

For solving this object, a separating device for separating particles from an intake air of an internal combustion engine is proposed. The separating device comprises two cyclone cells as well as a discharge device. The cyclone cells are designed to cause two raw air streams containing the intake air to rotate in opposite directions. The discharge device is designed to guide an exhaust air stream containing the particles tangentially away from a respective cyclone cell and to combine the exhaust air streams to a common exhaust air stream.

Since the discharge device combines both exhaust air streams to a common exhaust air stream, the two cyclone cells can be arranged very close to each other. Accordingly, the separating device is of a small size. Moreover, with regard to construction technology, a simplification results in that the common exhaust air stream can be sucked away by a single suction device. Moreover, the common exhaust air stream makes a flow through a respective cyclone cell more uniform. This improves the degree of separation.

Further advantages may result from the fact that a separate dust collecting chamber that is usually arranged about a plurality of cyclone cells is no longer required. A housing of the separating device can therefore be produced as a single part, for example, of plastic material, so that additional connecting elements and sealing measures are obsolete. Moreover, a more compact configuration may result in this way.

In principle, by means of the separating device any particle, i.e., solid and liquid particles, can be separated from any fluid. Instead of the two raw air streams, in this case two first fluid streams entering the two cyclone cells are caused to rotate in opposite directions. Accordingly, two second fluid streams that contain particles exit tangentially from a respective cyclone cell.

It is also possible to provide more than two cyclone cells.

The cyclone cells each can be designed, for example, in inline cyclone configuration in which the raw air stream to be purified is passed axially through a cylindrical main tube. As the raw air stream enters the main tube, it is caused to rotate by means of a guide apparatus at the inflow side. In this way, a screw-shaped course is forced upon the raw air stream. The particles contained in the raw air stream are transported by the centrifugal force in a radial outward direction in the direction of the wall of the main tube and accumulate thereat. A separation of the flow that is more strongly laden with particles from the flow that is less laden with particles (in other words, splitting the raw air stream into a clean air stream and an exhaust air stream) can be realized, for example, by means of an immersion tube which has a smaller diameter than the main tube and projects axially and concentrically into the latter at the exit side. The clean air stream, i.e., the air that is laden less with particles, passes inwardly through the immersion tube and exits through an exit opening of the separating device. The exhaust air stream, i.e., the air laden more strongly with particles, is discharged via a discharge opening arranged in the wall of the main tube from a cyclone cell, respectively.

Instead of the aforementioned inline cyclone configuration, the cyclone cells can also be designed as spiral cyclone cells, respectively. In such spiral cyclone cells, the flow is guided through a passage with a spiral-shaped course wherein the passage wall forms the guide apparatus.

The common exhaust air stream can be removed by suction by means of a suction device as an assisting means. For this purpose, a blower, a pump or an ejector can be provided. In this way, the degree of separation can be further improved.

The respective tangential exhaust air streams can be guided horizontally, vertically in downward direction or vertically in upward direction out of the respective cyclone cell. In this way, the installation position of the separating device can be flexibly embodied.

A guide apparatus for regaining angular momentum can be arranged downstream of a cyclone cell, respectively. Flow losses can be reduced by means of the apparatus for regaining angular momentum. The downstream guide apparatus for regaining angular momentum can comprise a guide vane arrangement and can be integrated into a housing of the separating device. Preferably, the downstream guide apparatus, i.e., arranged at the exit side, are arranged partially within immersion tubes of the cyclone cells so that a compact configuration results.

According to one embodiment, the discharge device has a discharge opening in an outer wall of a respective cyclone cell through which an air stream can be guided away. The outer wall can be formed by a housing of the separating device that contains the two cyclone cells.

According to a further embodiment, the discharge device comprises a discharge tube which has a gas-conducting connection with the discharge openings. The discharge tube can be configured in the form of a discharge socket. The discharge tube can be connected to an assisting suction device such as a blower, a pump, or an ejector, as described above.

According to a further embodiment, between the discharge openings a web is arranged that ensures that the exhaust air streams can first flow so as to be fluidically undisturbed by each other tangentially out of the respective cyclone cells and can subsequently flow together into the common discharge tube. The web can also be referred to as a partition.

According to a further embodiment, to a rim that delimits a discharge opening a web is attached which extends in the direction toward the discharge tube. The wording "extending in the direction toward the discharge tube" encompasses herein also the situation that the web extends into the discharge tube. In this way, it is avoided that the two exhaust flows negatively affect each other.

According to a further embodiment, the webs extend toward each other. This means that the orientation of the webs deviates minimally from the tangential such that the webs converge toward each other. In this way, the respective exhaust air stream can be fluidically combined in a favorable way to a common exhaust flow.

According to a further embodiment, the webs are joined to each other at their ends that are pointing in the direction toward the discharge tube. In this way, a simple and stable configuration results.

According to a further embodiment, the ends of the webs are connected to each other in a connecting area that tapers pointedly in the direction toward the discharge tube. In this way, the respective exhaust air streams can be combined smoothly to the common exhaust air flow.

The discharge openings preferably face each other and/or are arranged to neighbor each other. The term "neighbor" is, for example, a spacing of a few centimeters, for example, 5-25 cm.

A respective web can be formed monolithically with the rim associated with it. The term "monolithic" is to be understood herein such that the respective elements are consisting of one and the same piece of material. A respective web can thus be produced together with the rim associated with it by an injection molding process, for example. Also, the webs can be monolithically formed with each other. Moreover, the webs can be monolithically formed with the discharge tube.

According to a further embodiment, the outer walls of the two cyclone cells are monolithically formed. The outer walls each are preferably parts of a housing of the discharge device. For example, the outer walls can each be a part of a tube wherein the two tubes are in particular monolithically formed with each other.

According to a further embodiment, a respective cyclone cell has a guide apparatus which is designed to cause the intake air to rotate in a spiral shape or screw shape. As already explained above, the cyclone cells can be configured as an inline cyclone cell configuration or as a spiral cyclone cell configuration.

Moreover, an arrangement for purifying an intake air of an internal combustion engine is proposed. The arrangement has a pre-separator that is embodied as a separating device according to the invention and a main filter provided with a filter element. The term "filter element" is to be understood as a sieve filter. The filter element can be exchangeably arranged in the main filter.

The filter element can be, for example, in the form of a bellows which is flowed through from the exterior to the interior, or in reverse, by the clean air that is exiting from the separating device. Moreover, the filter element can also be embodied as a double bellows with two annular closed star-shaped folded filter bellows. The filter element can however also have a different configuration, in particular in the form of a wound element. A wound element can be formed of corrugated and flat layers of a filter medium that are lying upon each other and form alternatingly closed passages.

The arrangement can have, for example, a configuration which corresponds to that of the air filter disclosed in German patent application DE 10 2008 062 955 with the difference that the pre-separator described therein is replaced by the separating device according to the invention. The contents of the aforementioned German patent application is expressly incorporated by reference into the contents of the present application.

The further transfer of the clean air from the pre-separator to the main filter can be realized, for example, by means of an air guiding part. Alternatively, the pre-separator can be mounted also directly on the main filter. In particular, the pre-separator and the main filter can comprise a monolithic housing. The air guiding part and a housing of the pre-separator or of the main filter can be connected by means of a weld connection. In particular, an infrared or vibration weld connection can be used. However, also other connecting types such as gluing, screwing, snap-on connections or clamping are conceivable.

The dust collecting chamber cannot be emptied optimally in various solutions disclosed in the prior art so that there is the risk of clogging. Moreover, by using a dust collecting chamber, the assistance by the force of gravity is frequently required in order to ensure satisfactory dust discharge. Therefore, a horizontal dust discharge in solutions with dust collecting chambers is often not possible. However, exactly such a horizontal dust discharge can be obtained by means of the separating device according to the invention.

Further possible implementations of the invention comprise also combinations, not explicitly mentioned, of features of the embodiments or embodiment variants of the separating device or the arrangement that have been discussed above or will be disclosed in the following. In this context, a person of skill in the art will also add or modify individual aspects as improvements or supplements to the respective basic form of the invention.

Further embodiments of the invention are the subject matter of the dependent claims as well as of the embodiments of the invention described in the following. In the following, the invention will be explained in more detail with the aid of embodiments with reference to the attached Figures.

BRIEF DESCRIPTION OF THE DRAWINGS

It is shown in.

In the Figures same reference characters identify same or functionally the same elements inasmuch as nothing to the contrary is indicated.

DETAILED DESCRIPTION

Figure 1:
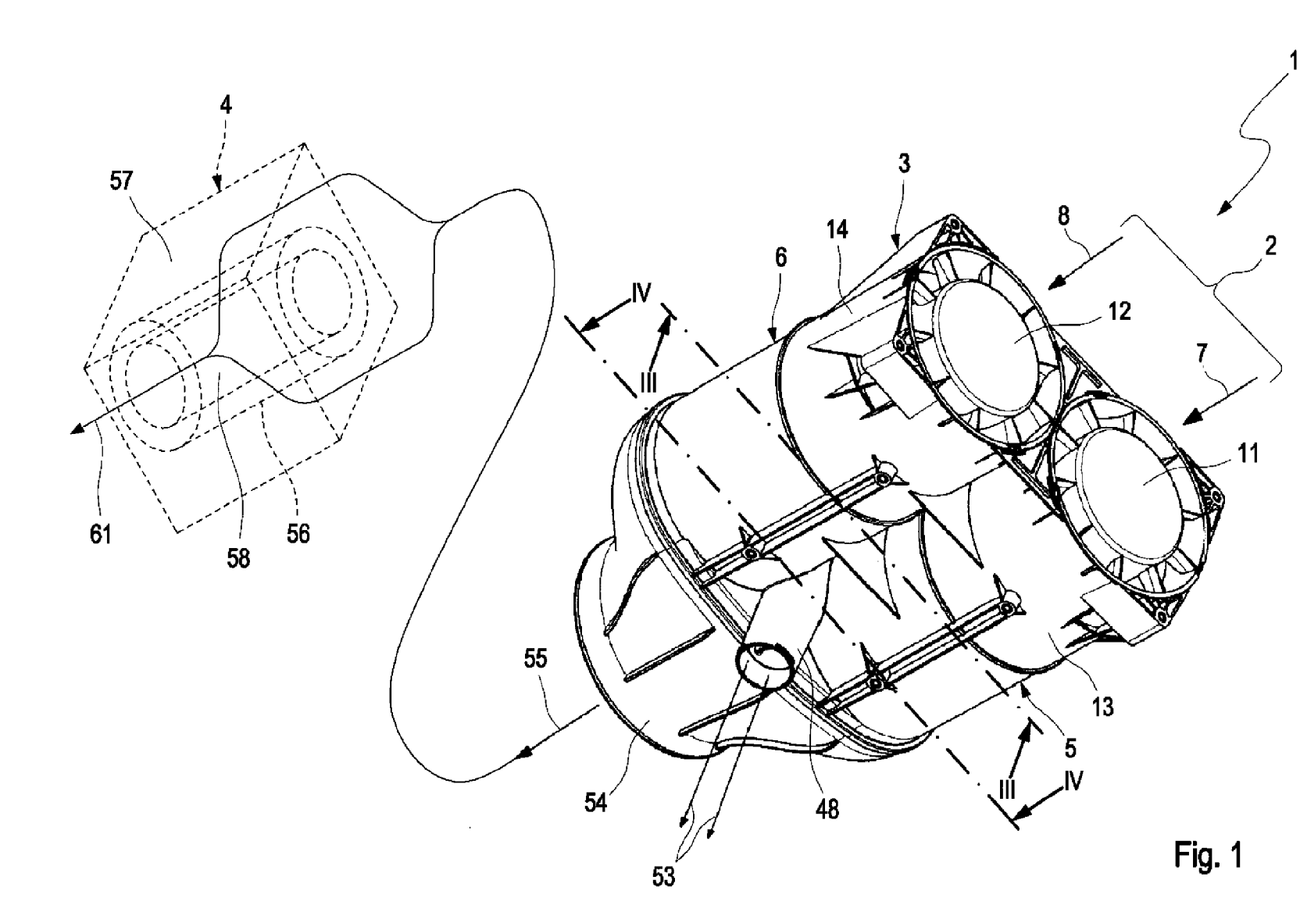
FIG. 1: in a perspective view an arrangement with a separating device according to one embodiment.

FIG. 1 shows in a perspective view an arrangement 1 for purifying an intake air 2 of an internal combustion engine, not illustrated.

The arrangement 1 comprises a pre-separator in the form of a separating device 3 and a main filter 4. The separating device 3 will be further explained in more detail in the following with the aid of FIGS. 2-4, wherein FIG. 2 is an exploded view of the separating device 3 of FIG. 1, FIG. 3 is a section III-III of FIG. 1, and FIG. 4 a section IV-IV of FIG. 1.

The separating device 3 comprises two cyclone cells 5, 6. The intake air 2 comprises two raw air streams 7, 8 wherein the raw air stream 7 is supplied to the cyclone cell 5 and the raw air stream 8 to the cyclone cell 6. The cyclone cells 5, 6 are embodied in the embodiment in inline cyclone cell configuration. A respective cyclone cell 5, 6 comprises a guide apparatus 11, 12 and a main tube 13, 14.

Figure 2:
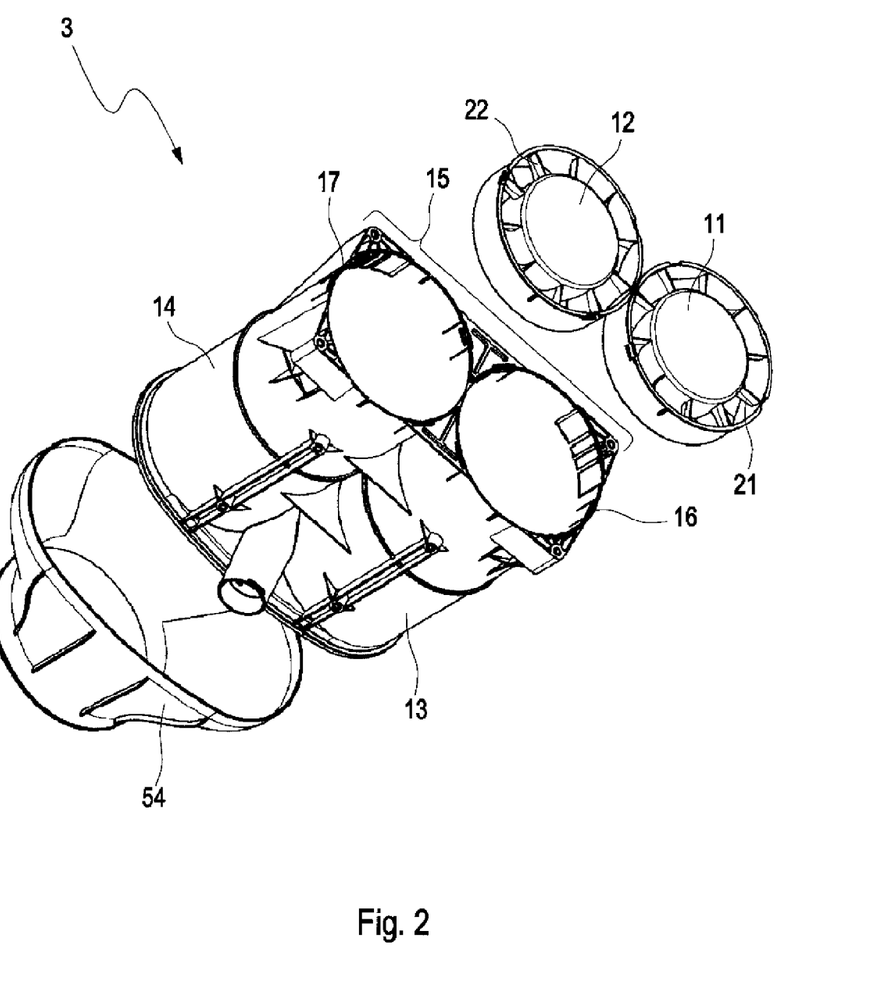
FIG. 2: in an exploded view perspectively the separating device of FIG. 1.
Figure 3:
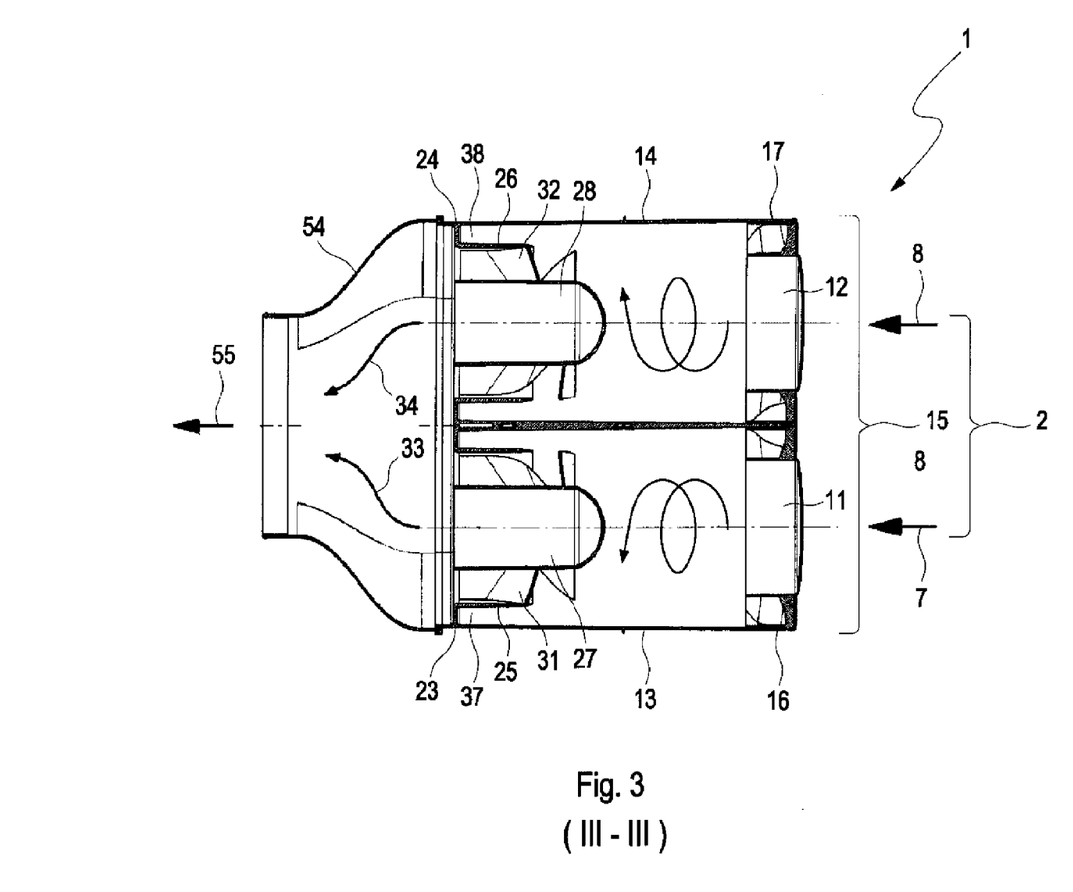
FIG. 3: a section III-III of FIG. 1.

The main tubes 13, 14 are connected to each other to a monolithic housing 15, as can be seen in FIGS. 2 and 3. The guide apparatus 11, 12 are inserted at the intake-side ends 16, 17 of the main tubes 13, 14, respectively.

The guide apparatus 11, 12 each have radial vanes 21, 22. The guide apparatus 11 is designed, for example, such that the raw air stream 7 is swirled, viewed in the flow direction, to the left (see FIG. 3). The guide apparatus 12, on the other hand, is designed to swirl the raw air stream 8, viewed in the flow direction, to the right. In the area of the exit-side ends 23, 24 of the main tubes 13, 14 immersion tubes 25, 26 extend into the latter. In each immersion tube 25, 26 a guide apparatus 27, 28 is arranged for regaining angular momentum. The guide apparatus 27, 28 can be provided with appropriate vanes 31, 32 for this purpose.

Figure 4:
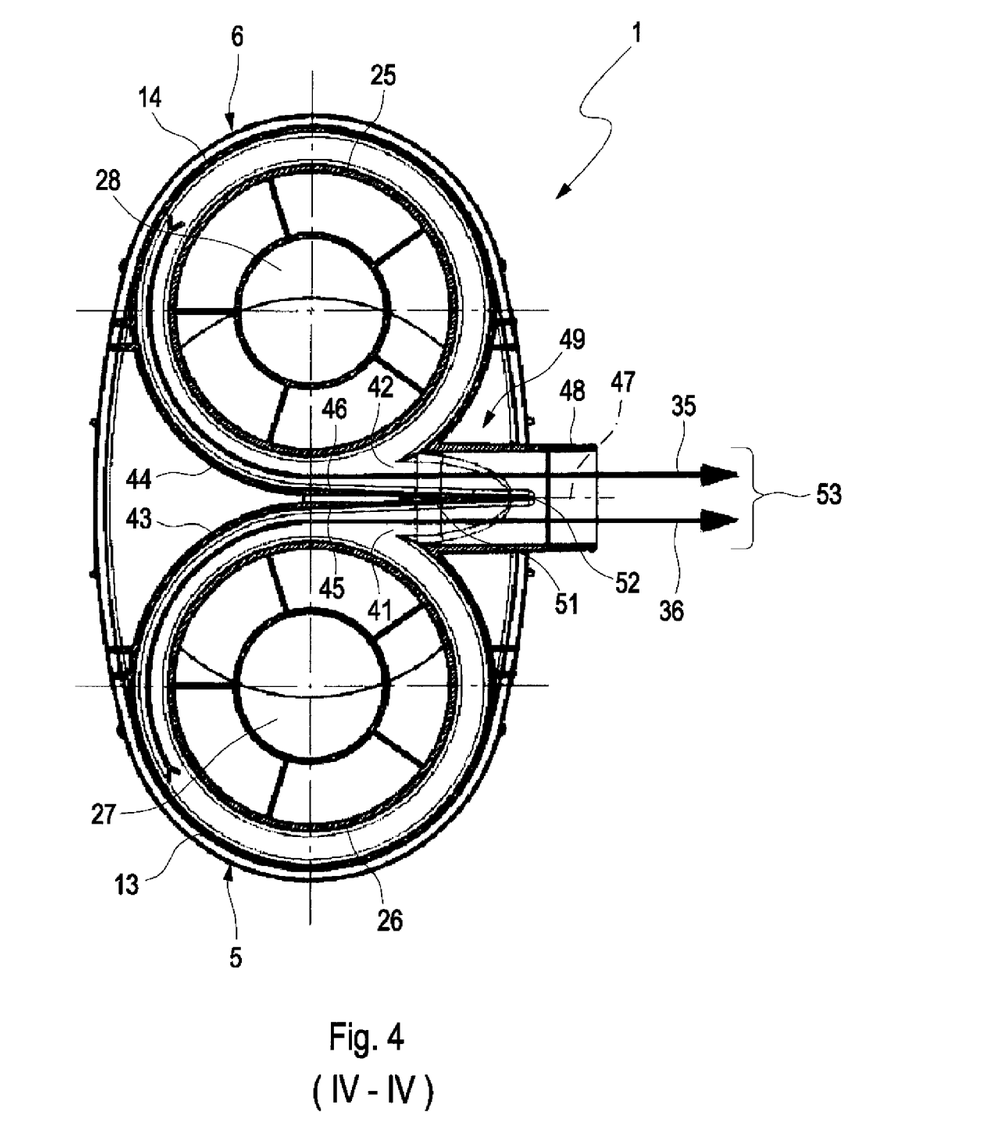
FIG. 4: a section IV-IV of FIG. 1.

In the area of the immersion tubes 25, 26 the raw air stream 7, 8 is divided into a clean air stream 33, 34, which exits centrally from the corresponding immersion tube 25, 26, as well as an exhaust air stream 35, 36 (see FIG. 4). A respective exhaust air stream 35, 36 is discharged from a respective annular chamber 37, 38 (see FIG. 3), which is formed between the immersion tube 25, 26 and the main tube 13, 14, through a discharge opening 41, 42, see FIG. 4, from the respective cyclone cell 5, 6. The discharge openings 41, 42 each are formed radially in a respective main tube 13, 14. The discharge openings 41, 42 face each other and are immediately neighboring each other, for example, at a spacing of 2-10 cm. On the rims 43, 44 of the discharge openings 41, 42 a web 45, 46 is attached, wherein the webs 45, 46 extend toward a symmetry line 47 and into a discharge socket 48. The cyclone cells 5, 6 are substantially mirror-symmetrical relative to the symmetry line 47. The discharge openings 41, 42 form together with the webs 45, 46 and the discharge socket 48 a discharge device 49. The webs 45, 46 each are monolithically formed with the rims 43, 44 as well as monolithically formed with each other. In a connecting area 51 the webs 45, 46 are connected to each other and form a tip 52. Moreover, the discharge socket 48 is formed monolithically with the rims 43, 44 and extends coaxial to the symmetry line 47. In this way, a circumferential sealing action of the discharge openings 41, 42 results so that the exhaust air streams 35, 36 each are tangentially guided away from their respective annular spaces 37, 38 and guided into the discharge socket 48. Behind the tip 52 the exhaust air streams 35, 36 form a common exhaust air stream 53. The discharge socket 48 can be connected in a way not illustrated with a suction device, for example, in the form of a pump which removes by suction the common exhaust air stream 53. A great portion of the particles contained in the raw air streams 7, 8 can thus be separated by means of the exhaust air streams 35, 36.

Returning now to FIG. 3, it is shown therein that an air guiding device 54 is attached to the housing 15 in the area of the exit-side ends 23, 24. The air guiding device 54 can taper in the flow direction and can combine the clean air streams 33, 34 (air streams with minimal particle proportion) to a common clean air stream 55. The air guiding device 54 and the housing 15 can be welded to each other. For example, infrared or vibration welding can be used in this context. Other types of connections such as gluing, screwing, snap-on connections or clamping are conceivable also.

As shown furthermore in FIG. 1, the common clean air stream 55 is supplied to the main filter 4. The main filter 4 has a filter element 56 that is in particular exchangeable. The filter element 56 can be designed, for example, in the form of an annularly closed star-shaped filter bellows. According to the embodiment, the filter bellows 56 is flowed through from the exterior 57 to the interior 58 wherein the clean air stream 55 is further purified. In particular smaller particles still contained in the clean air stream 55 are filtered in this way. Subsequently the clean air 61 that has been filtered even more is supplied to the internal combustion engine, not illustrated.

Figure 5:
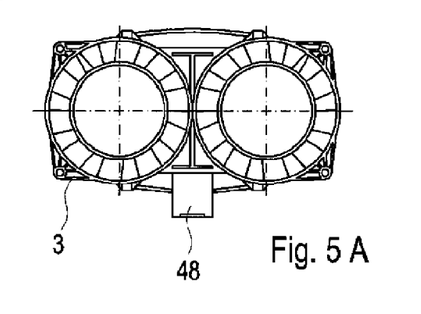
FIGS. 5A-5D: the separating device of FIG. 1 in various orientations.

In FIGS. 5A-5D, the different mounting situations of the separating device 3 that are possible are illustrated. In this connection, the discharge socket 48 in FIG. 5A is pointing downwardly so that a discharge with assistance of the force of gravity can take place here. In FIGS. 5B and 5D, the discharge socket 48 points in horizontal direction. In FIG. 5C, the discharge socket 48 points vertically in upward direction. However, slanted orientations of the discharge socket 48 are conceivable also.

Figure 6:
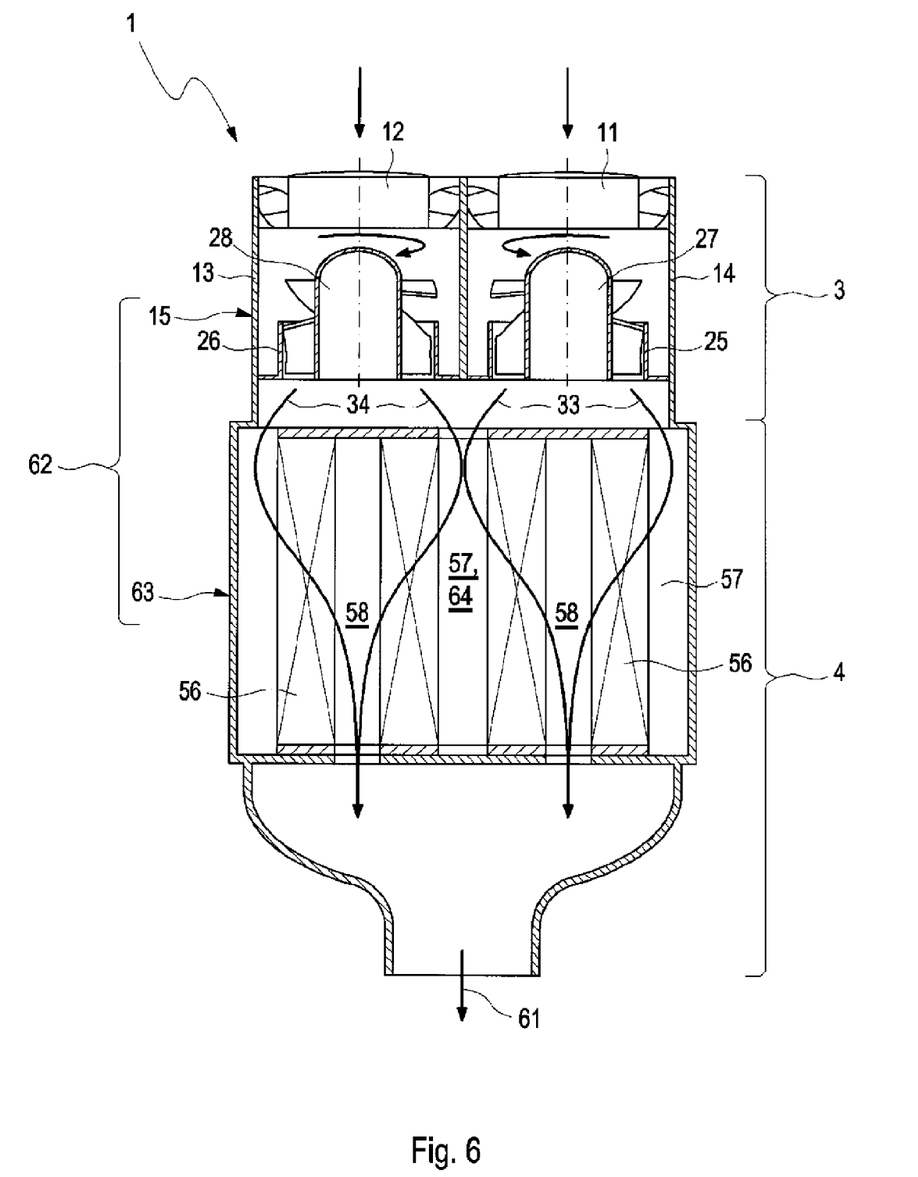
FIG. 6: a section view of an arrangement with a separating device according to a further embodiment.

FIG. 6 shows in a section view an arrangement 1 according to a further embodiment.

The arrangement 1 comprises also a separating device 3 and a main filter 4. In contrast to the embodiment of FIG. 1, a single housing 62 is provided which is at the same time the housing 15 of the separating device 3 and moreover a housing 63 of the main filter 4. The separating device 3 and the main filter 4 are thus arranged in immediate vicinity to each other. An air guiding device 54 as illustrated in the embodiment according to FIG. 1 is not needed.

Moreover, the embodiment of FIG. 6 differs from the embodiment according to FIG. 1 in that several filter elements 56 are provided in the main filter 4. The filter elements 56 are arranged adjacent to each other transversely to the flow direction so that the clean air streams 33, 34 also can flow into an intermediate space 64 between the filter elements 56. From here, the clean air streams 33, 34 flow through the filter elements 56 from the exterior 57 to the interior 58, as already explained in connection with FIG. 1.

Figure 7:
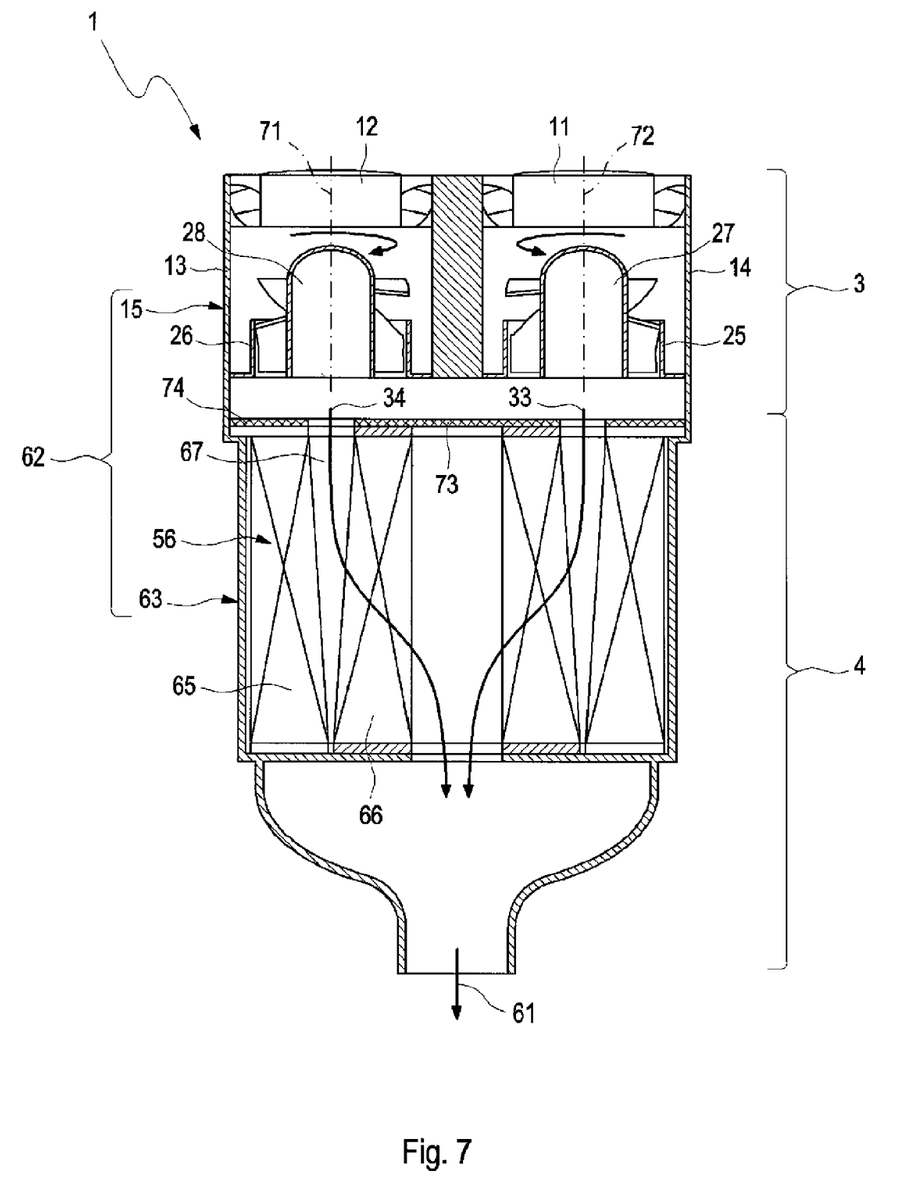
FIG. 7: a section view of an arrangement with a separating device according to yet another embodiment.

FIG. 7 shows in a section view an arrangement 1 according to a further embodiment. It represents a variant relative to the embodiment of FIG. 6.

In contrast to the embodiment according to FIG. 6, in the embodiment according to FIG. 7 a filter element 56 is provided which comprises an outer annular filter bellows 65 and an inner annular filter bellows 66. The filter bellows 65, 66 form a gap 67 that is open toward the raw side. The gap 67 can be positioned directly opposite the immersion tubes 25, 26 or their central axes 71, 72. Moreover, sealing elements 73, 74 are provided which ensure a sealing action between the raw and the clean sides of the filter element 56. The configuration of the filter element 56 corresponds substantially to the configuration known from DE 10 2008 062 955 A1. The filter element 56 could also be embodied or configured differently, as disclosed in the further embodiments of DE 10 2008 062 955 A1.

Even though the invention has been described here with the aid of preferred embodiments, it is not limited in any way thereto, i.e, is modifiable in various ways.

Moreover, the filter element 56 could have a configuration which has not been disclosed in any of the preceding embodiments. For example, a filter element in the form of a wound element could be provided which comprises corrugated and flat layers of a filter medium that are lying upon each other and form alternatingly closed passages.

The invention claimed is:

1. Separating device for separating particles from an intake air of an internal combustion engine, comprising
   a first cyclone cell configured to cause a raw air stream to rotate in a first direction to separated particles into a tangential first exhaust stream;
   a second cyclone cell arranged adjacent to the first cyclone cell and configured to cause a raw air stream to rotate in a second direction opposite to the first direction to separated particles into a tangential second exhaust stream;
   a discharge device which is designed to guide the first exhaust air stream and the second exhaust air stream containing the particles tangentially away from the first and the second cyclone cell and to combine the first and the second exhaust air streams to a common exhaust air stream;
   wherein the discharge device comprises a first discharge opening in an outer wall of the first cyclone cell and a second discharge opening in an outer wall of the second cyclone cell through which a respective exhaust air stream can be guided away;
   wherein the discharge device comprises a discharge tube which is in gas-conducting connection with the first and second discharge openings;
   wherein the discharge tube is arranged between the first cyclone cell and the second cyclone cell;
   wherein the opposite rotation direction of the second cyclone cell relative to the first cyclone cell directs the first exhaust stream and the second exhaust stream in a common direction into and to merge in the discharge tube.

2. The separating device according to claim 1, wherein
   the first and a second cyclone cells each have a rim that delimits a respective discharge opening on the respective outer wall of the two cyclones;
   wherein the rim delimiting the first discharge opening of the first cyclone cell has a web attached;
   wherein the rim delimiting the second discharge opening of the second cyclone cell has a web attached;
   wherein the web of each of the first and second cyclone cells each extend into an interior of the discharge tube, combining the first exhaust air stream and the second exhaust air stream into the common exhaust air stream in the interior of the discharge tube.

3. The separating device according to claim 2, wherein the web of each of the first and second cyclone cells extend toward each other in the interior of the discharge tube.

4. The separating device according to claim 3, wherein the web of each of the first and second cyclone cells at their ends in the discharge tube are connected to each other and form a tip in the interior of the discharge tube.

5. The separating device according to claim 1, wherein the first discharge opening and the second discharge opening are oriented toward each other and/or or are arranged neighboring each other.

6. The separating device according to claim 1, wherein the outer wall of the first cyclone cell and the outer wall of the second cyclone cell are monolithically formed with each other.

7. The separating device according to claim 1, that the first cyclone cell and the second cyclone cell each comprise a guide apparatus which is designed to cause the raw air streams to rotate in a screw shape or a spiral shape.

8. An arrangement for cleaning an intake air of an internal combustion engine with a pre-separator embodied as a separating device according to claim 1 and a main filter comprising a filter element.

* * * * *